Nov. 21, 1961  E. D. O'BRIEN  3,009,825
PROCESS AND APPARATUS FOR COATING GRANULAR MATERIAL
Filed July 20, 1956  2 Sheets—Sheet 1
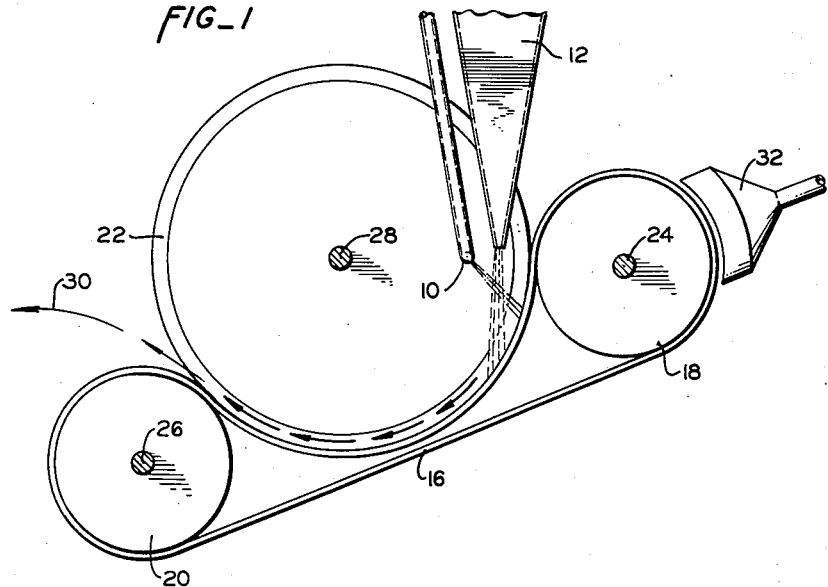
FIG_1
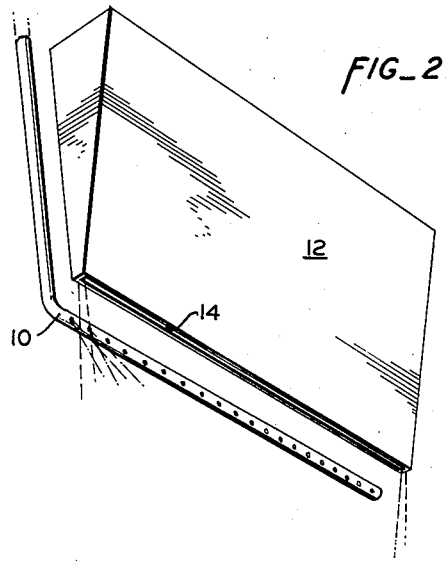
FIG_2
INVENTOR.
EDWARD D. O'BRIEN
BY
Naylor & Neal
ATTORNEYS

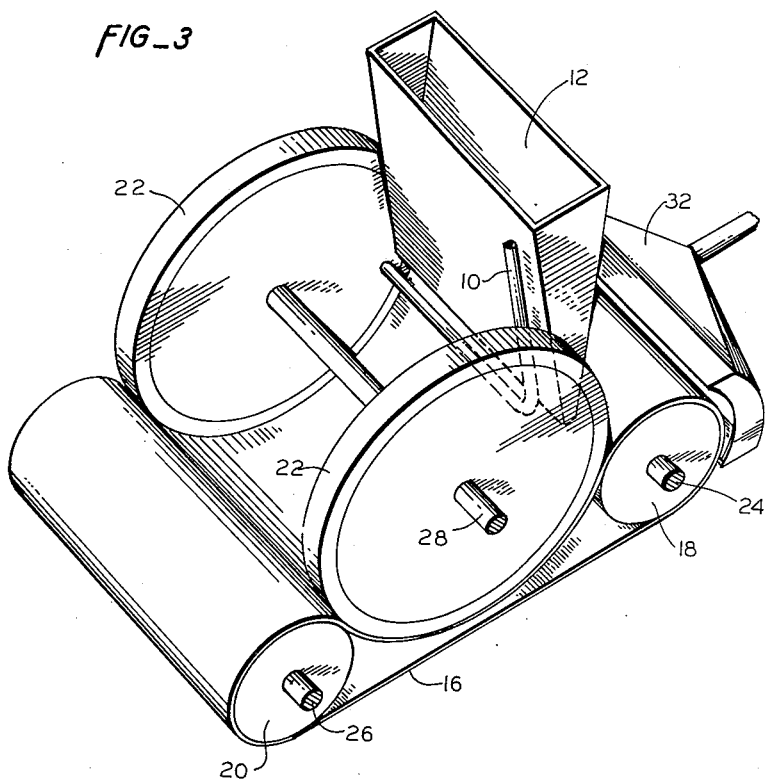

United States Patent Office 3,009,825
Patented Nov. 21, 1961

3,009,825
PROCESS AND APPARATUS FOR COATING
GRANULAR MATERIAL
Edward D. O'Brien, 585 Woodside Drive,
Woodside, Calif.
Filed July 20, 1956, Ser. No. 599,062
9 Claims. (Cl. 117—100)

This invention relates to the art of applying a coating material to a granular carrier material, and more particularly to a process and apparatus for applying a solution containing the coating material as a solute to a granular material, which is readily reduced to mud or caused to agglomerate by the solvent of said solution, while preserving the granular form of the carrier material.

The subject process and apparatus may be employed for the addition of various coating materials to various granular carrier materials. However, the process and apparatus are particularly applicable and useful in the treatment of crop dusting materials. For example, it is desired at the present time to avoid the use of flying dust material in connection with the dissemination from the air of such as fertilizers and insecticides, because such fine dusts are readily carried by the wind onto adjacent property or onto crops where no immediate dusting is desired. A comparatively recent concept in this field is to apply a liquid-soluble insecticide as a coating to a liquid-soluble granular carrier material, the particles of which are of sufficient size and weight to prevent them from being windblown in the manner of fine dusts. The chief problem presented is the application of the solution to the carrier particles without converting the carrier particles to mud, or otherwise cause them to either break down or agglomerate. A desirable carrier material is fuller's earth, and a desirable particle size for the carrier granules is 20–30 mesh. Such granules of fuller's earth are practically instantly converted to mush or mud if they are immersed in liquid or brought into contact with liquid without effecting the granular form of the material.

The essential object of this invention is to provide a process and apparatus whereby granular material which normally is readily broken down or agglomerates under the wetting action of a liquid may be wetted by said liquid for more than a very brief moment.

This and other objects and advantages of the invention will be apparent from the following description taken in conjunction with the drawings forming part of this specification, and in which:

FIGURE 1 is a view of the apparatus, with the conveyor portion thereof being shown in vertical longitudinal section, and with feed hopper and liquid spray head components being shown in side elevation;

FIGURE 2 is a view in perspective of the hopper and liquid spray ead components of the apparatus; and FIGURE 3 is a view in perspective of the apparatus of FIGURE 1.

Except for the liquid spray head 10 and for the fact that the hopper 12 is provided with a very narrow slot-like opening 14, the apparatus of FIGURE 1 is essentially the same as that shown in United States Letters Patent to Sinden 1,597,393. In fact, save for the distinctions above mentioned, FIGURE 1 is patterned after FIGURE 3 of said patent. The conveyor shown in said patent and in FIGURE 1 of the present drawing is known in the trade as a "Sinden Loader." It is commonly employed to load granular material or material of small particle size, such as bulk sugar, into freight cars, ships, etc. and to unload the same therefrom.

This "Sinden Loader" is comprised of a continuous conveyor belt 16 which is trained about a drive roller 18 and an idler roller 20 and trained beneath a pair of large idler wheels 22 which are disposed above the marginal edges of the belt. The rollers 18 and 20 and the idler wheels 22 are fixedly mounted, respectively, on shafts 24, 26 and 28 which are mounted in bearings, not shown, carried by a suitable support frame, not shown, and power means, not shown is provided to drive shaft 24 in a counterclockwise direction, with reference to FIGURE 1. A hopper, such as 12, positioned over the belt between the idler wheels 22 and adjacent roller 18 is adapted to deposit the material to be conveyed onto the belt 16.

The belts of "Sinden Loaders" are normally driven at a relatively high rate of speed, such as, for example, 3,000 feet per minute. A high degree of centrifugal force is applied to the material on the belt as the belt travels the arc defined by the underside of the periphery of the idler wheels 22, with the result that the material tends to cling to the belt and almost instantly acquire the full speed of the belt. In an average size "Sinden Loader," the material remains on the belt for only a brief instant, such as $\frac{1}{50}$ of a second. The material is thrown from the belt in the direction of the arrow 30 at a high rate of speed, and the material is therefore thrown for a distance of many feet, depending upon the rate of travel of the belt. The discharge material may be accurately directed into such as a freight car, or the like.

I have discovered that a "Sinden Loader" in combination with a hopper having a narrow outlet 14 adapted to cause a relatively narrow curtain of material to drop onto the belt and a liquid spray head 10 adapted to direct a sheet-like spray of liquid through the falling material and onto the belt enables me to successfully solve the problem of wetting the surface of granular materials, the granular form of which is normally broken down or agglomerated by the wetting liquid, without disturbing the size and shape pattern of the granules. Best results are obtained when a thin liquid spray is used, and when the spray is directed through the falling material to a location on the belt ahead of the belt area on which the material is deposited.

In practice, I have deposited white colored fuller's earth particles of about 20–30 mesh size onto the belt at a rate of 3,000 pounds per hour. Water, containing a blue dye as a solute, was sprayed onto the belt at a rate of 200 gallons per hours. The belt was driven at a speed of about 3,000 feet per minute. The originally white particles were substantially uniformly colored blue. Upon picking up a handful of the coated granules, a feeling of slight moistness was apparent to the hand. However, the granules could be gently rolled between the finger-tips without causing them to crumble, or to turn into a mush-like paste. No agglomeration of particles was apparent, and the degree of "fines" in the material was not increased in any measurable degree.

I believe that this desirable result is obtained for the following reasons, although I do not wish to be limited to any explanation as to why this result is obtained. I believe that most of the material is wetted after it hits the belt, and that only a minor amount of this material is wetted by the very thin sheet-like spray pattern passing through the thin curtain-like material pattern. I believe that the water, upon hitting the belt, is immediately caused by the high centrifugal force present to attenuate itself into a thin film. The falling granular material hits the wetted belt at a speed of perhaps 200 ft. min.; and the particles are then caused to roll, due to relative movement between them and the belt, until they attain the speed of the belt. This action together with resultant contact between the water layer and the material layer for about 1/50 of a second, until the material is discharged from the belt, enables the particles to pick up an optimum amount of moisture, i.e. enough to wet substantially all the surface area of the granules but not enough to penetrate the granules to a point where they will be caused to crumble or be converted to a mushy condition.

In practice, the discharge material was hurled through the air a distance of perhaps 15 feet or so into a collector hopper. I believe that the relatively high rate of travel of the particles through the air causes some drying of the surface moisture on the particles, thereby further insuring against agglomeration and minimizing the possibility of the granular form of the particles being broken down by the action of the particles coming to a stop in the collector hopper.

Substantially 100% of the particles charged onto the belt are discharged therefrom, i.e. substantially none of them adhere to the wet belt and travel around the idler roller 20. Also, most of the water sprayed onto the belt is picked up by the granular material, i.e. very little water flies off the belt with the granular material, and that which does is broken up by air resistance and caused to fall short of the granular material in the collector hopper.

In the event that the granular material is to be wetted by a relatively sticky liquid, such as a hydrocarbon, it may be desirable to dispose a vapor chamber, designated at 32, in juxtaposition to the belt to deposit on the belt a very thin film of solvent or liquid before the sticky liquid is applied to the belt. The intermediate film of solvent or liquid would act as a buffer between the belt and the sticky liquid and thus allow a clean discharge of the wetted granules from the belt.

What is claimed is:

1. Apparatus for coating granular material comprising a continuous conveyor belt trained about driver and idler rollers and beneath and in engagement with substantial portions of the peripheries of a pair of spaced idler wheels, and drive means for said driver roller, and in combination therewith material feed means having a narrow slot-like outlet opening adapted to drop a relatively thin curtain of granular material onto said belt between said idler wheels and adjacent said driver roller, and a liquid spray head adapted to direct a relatively thin spray of liquid onto said belt.

2. Apparatus for coating granular material comprising a continuous conveyor belt trained about driver and idler rollers and beneath and in engagement with substantial portions of the peripheries of a pair of spaced idler wheels, and drive means for said driver roller, and in combination therewith material feed means having an attenuated discharge opening adapted to drop a relatively thin curtain of granular material onto said belt between said idler wheels and adjacent said driver roller, and a liquid spray head so positioned with respect to said feed means as to be adapted to direct a relatively thin spray of liquid onto said belt at a location between said curtain of granular material and said driver roller.

3. A method for coating granular material comprising training a continuous conveyor belt so that the upper and conveying reach thereof defines a substantial portion of the lower 180° periphery of a cylindrical path having a horizontally disposed axis of rotation, depositing a thin layer of granular material of particle size onto the upper reach of said belt adjacent the end thereof at the commencement of the coincidence of said belt with said periphery of said cylindrical path, and spraying a liquid onto said belt adjacent the same end thereof at which said granular material is deposited, while causing said belt to travel at a speed sufficient to enable said granular material to quickly reach the speed of travel of said belt.

4. A method for coating granular material comprising training a continuous conveyor belt so that the upper and conveying reach thereof defines a substantial portion of the lower 180° periphery of a cylindrical path having a horizontally disposed axis of rotation, continuously wetting said upper reach of said belt with a liquid, continuously depositing a thin layer of granular material of particle size onto the upper reach of said belt adjacent the end thereof at the commencement of the coincidence of said belt with said periphery of said cylindrical path, and continuously moving said belt at a speed sufficient to enable said granular material to quickly reach the speed of travel of said belt.

5. A method for coating granular material comprising training a continuous conveyor belt so that the upper and conveying reach thereof defines a substantial portion of the lower 180° periphery of a cylindrical path having a horizontally disposed axis of rotation, directing a continuous spray of liquid onto the upper reach of said belt, continuously dropping granular material through said spray and then onto the upper reach of said belt, and continuously causing said belt to travel at a speed sufficient to enable said granular material to quickly reach the speed of travel of said belt.

6. A method for treating granular material comprising constraining an attenuated layer of granular material to travel a path which defines a substantial portion of the periphery of a cylinder while rapidly moving said material through said path, and contacting said material with a liquid while it is being moved through said path.

7. A method for wetting the surfaces of granules of a material with a liquid comprising constraining an attenuated layer of said granules to travel a path which defines a substantial portion of the periphery of a cylinder described about a horizontally disposed axis while rapidly moving said granules through said path, and contacting said granules with a liquid while they are being moved through said path.

8. Apparatus adapted to coat granular material with a liquid comprising conveyor means and means constraining the same to move along an arcuate path defining a substantial portion of the periphery of a cylinder, said conveyor means being operable to whirl granular material applied thereagainst with a high degree of centrifugal force and thereby cause said material to attenuate itself over said conveyor means into a thin layer having substantially the speed of movement of said conveyor means, feed means to apply granular material against said conveyor means, and means to wet said conveyor means with the liquid to coat said granular material.

9. A method for coating granular material with a liquid comprising constraining a thin layer of said granular material to centrifugally whirl for a brief instant of time in engagement with a thin layer of liquid to coat said material and in a path which defines a substantial portion of the periphery of a cylinder, and abruptly releasing said material from said constrained condition.

References Cited in the file of this patent

UNITED STATES PATENTS

| 947,129 | Robeson | Jan. 18, 1910 |
| 1,597,393 | Sinden | Aug. 24, 1926 |
| 1,846,518 | Hibline | Feb. 23, 1932 |
| 2,420,368 | Giordano | May 13, 1947 |
| 2,604,416 | Dolbey | July 22, 1952 |
| 2,843,080 | Woodruff | July 15, 1958 |

FOREIGN PATENTS

| 18,349 | Great Britain | Sept. 1, 1909 |
| 261,896 | Germany | July 3, 1913 |